US007149954B2

(12) United States Patent
Neuman et al.

(10) Patent No.: US 7,149,954 B2
(45) Date of Patent: Dec. 12, 2006

(54) METHOD AND SYSTEM FOR PROGRAMMABLE FIELD STATISTIC FOR PICTURE CYCLIC REDUNDANCY CHECK (CRC)

(75) Inventors: Darren Neuman, Palo Alto, CA (US); Chengfuh Jeffrey Tang, Saratoga, CA (US); Yao-Hua Steven Tseng, Fremont, CA (US); Guang Ting Shih, San Jose, CA (US); Wen Huang, San Jose, CA (US); Charles Thomas Monahan, Mountain View, CA (US)

(73) Assignee: Broadcom Corporation, Irvine, CA (US)

( * ) Notice: Subject to any disclaimer, the term of this patent is extended or adjusted under 35 U.S.C. 154(b) by 506 days.

(21) Appl. No.: 10/646,717

(22) Filed: Aug. 25, 2003

(65) Prior Publication Data

US 2005/0039102 A1 Feb. 17, 2005

Related U.S. Application Data

(60) Provisional application No. 60/495,122, filed on Aug. 15, 2003.

(51) Int. Cl.
*H03M 13/09* (2006.01)
*H04N 7/64* (2006.01)

(52) U.S. Cl. .................. 714/807; 348/180; 348/192
(58) Field of Classification Search ................ 714/807; 348/180
See application file for complete search history.

(56) References Cited

U.S. PATENT DOCUMENTS

| 4,516,164 | A | | 5/1985 | Moxon |
| 4,894,718 | A | * | 1/1990 | Hung .......................... 348/181 |
| 5,734,422 | A | * | 3/1998 | Maurer et al. .............. 348/184 |
| 5,912,972 | A | | 6/1999 | Barton |
| 5,917,559 | A | * | 6/1999 | Um ....................... 375/240.26 |
| 5,948,119 | A | * | 9/1999 | Bock et al. .................. 714/807 |
| 5,953,418 | A | | 9/1999 | Bock et al. |
| 6,006,352 | A | * | 12/1999 | Kitabatake .................. 714/752 |
| 6,281,929 | B1 | * | 8/2001 | Fimoff ........................ 348/180 |
| 6,282,204 | B1 | | 8/2001 | Balatoni et al. |
| 6,523,114 | B1 | * | 2/2003 | Barton ........................ 713/176 |

OTHER PUBLICATIONS

European Search Report from European Patent Application No. 04017520.0, 3 pages, dated Mar. 16, 2005.

* cited by examiner

*Primary Examiner*—Stephen M. Baker
(74) *Attorney, Agent, or Firm*—Sterne, Kessler, Goldstein & Fox PLLC

(57) ABSTRACT

Provided is a system and method for performing CRC analysis in a video test bench. An exemplary system includes a memory configured for storing a required number representative of the data fields to be analyzed. A module is coupled at least indirectly to the memory and configured for (i) receiving an input data stream, (ii) performing cyclic redundancy check (CRC) analysis of the received data stream, and (iii) producing an output representative of an actual number of received data fields analyzed. The input data stream includes synchronization markers defining boundaries of each of the received data fields. Next, a comparator is configured for (i) comparing the required number and the actual number and (ii) producing a disabling signal when the actual number matches the required number. A detector is coupled to the comparator and configured for (i) receiving the input data stream and sensing a presence of the synchronization markers, (ii) receiving the disabling signal, and (iii) disabling the CRC module when the disabling signal is received.

12 Claims, 6 Drawing Sheets

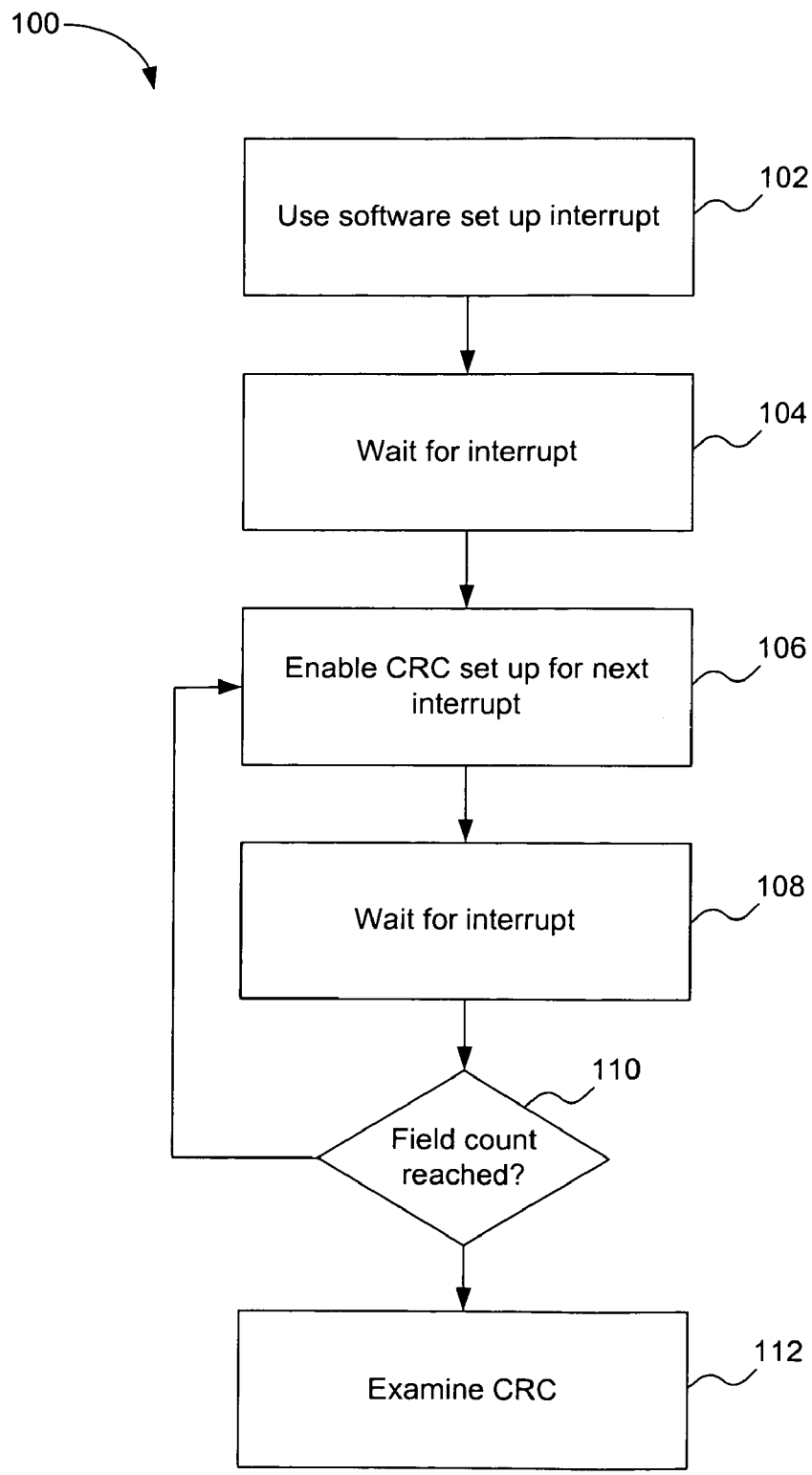
FIG. 1
Conventional

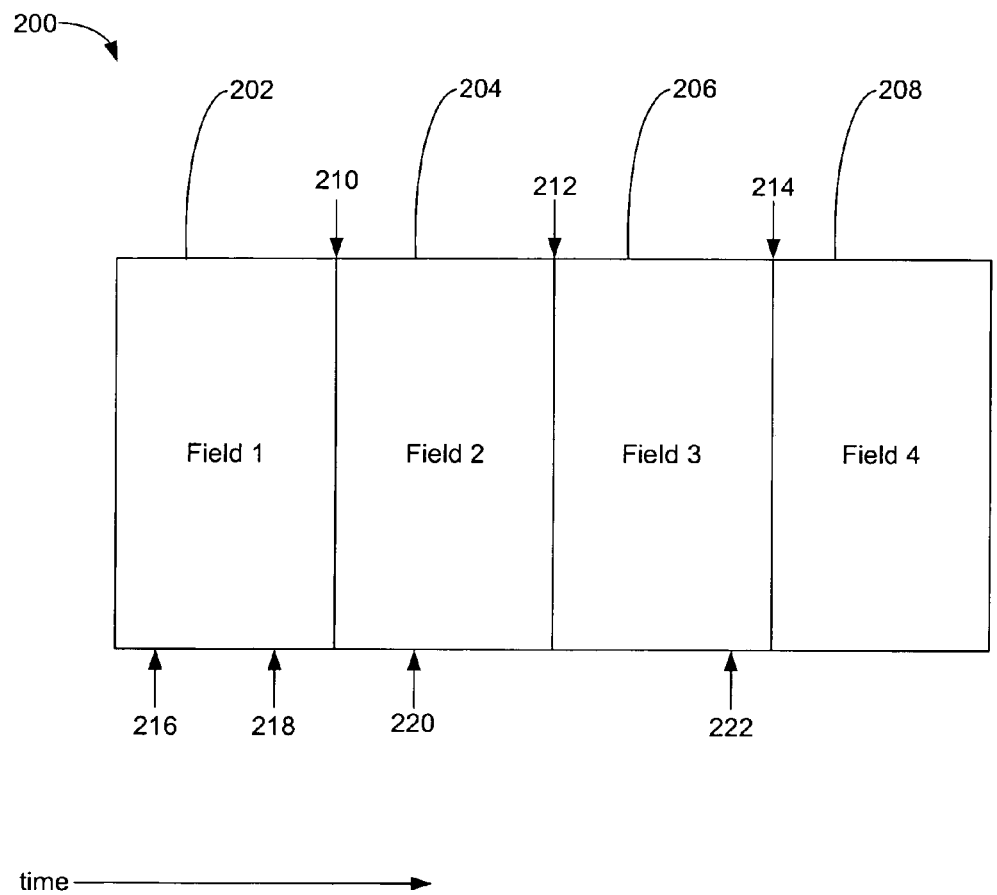
FIG. 2
Conventional

METHOD AND SYSTEM FOR PROGRAMMABLE FIELD STATISTIC FOR PICTURE CYCLIC REDUNDANCY CHECK (CRC)

CROSS-REFERENCE TO RELATED APPLICATIONS

This application claims the benefit of U.S. Provisional Application No. 60/495,122, filed Aug. 15, 2003, which is incorporated herein by reference.

BACKGROUND OF THE INVENTION

1. Field of the Invention

The present invention relates generally to CRC check sum analysis during video data testing procedures.

2. Related Art

CRC analysis is used, for example in analysis of video graphics data paths. The CRC analysis records check sums associated with video data fields transmitted in the form of video pixels. Video pixels include signal frame data, such as vertical synchronization pulses, which can be used as boundaries to distinguish one pixel data field from another pixel data field. In performing the check sum analysis, CRC modules are typically used to accumulate and analyze the associated CRC pixel check sums.

Traditional bench test set-ups are unable to consistently distinguish one pixel data field from another pixel data field in the absence of complicated software. Therefore, during traditional bench testing, the CRC modules continuously record pixel checksums without strict regard for pixel data field boundaries. Such continuous recording, however, creates inconsistencies within the accumulated check sums because of the CRC module's inability to distinguish the individual data fields. Consequently, the CRC module is unable to associate the accumulated check sums with their respective data fields.

Several well known software techniques can be used in more formal test settings to synchronize the timing of the CRC module's activation with the occurrence of pixel data field boundaries. In these more formal test settings, this synchronism facilitates association of individual check sums with their respective data fields based upon data field boundaries defined by, for example, the vertical synchronization pulses.

What is needed, therefore, is a technique that can be used during test bench debugging to facilitate synchronization between CRC module activation and the occurrence of synchronization markers. What is also needed is a technique that will enable a user to designate a particular number of data fields for CRC check sum analysis by the CRC module.

BRIEF SUMMARY OF THE INVENTION

Consistent with the principles in the present invention as embodied and broadly described herein, an apparatus for conducting bench testing of data fields includes a memory configured for storing a required number representative of the data fields to be analyzed. Also included is a module, coupled at least indirectly to the memory and configured for (i) receiving an input data stream, (ii) performing cyclic redundancy check (CRC) analysis of the received data stream, and (iii) producing an output representative of an actual number of received data fields analyzed. The input data stream includes synchronization markers defining boundaries of each of the received data fields Next, a comparator is included and configured for (i) comparing the required number and the actual number of received data fields and (ii) producing a disabling signal when the actual number matches the required number. A detector is coupled to the comparator and configured for (i) receiving the input data stream and sensing a presence of the synchronization markers, (ii) receiving the disabling signal, and (iii) disabling the CRC module when the disabling signal is received.

Further features and advantages of the present invention, as well as the structure and operation of various embodiments of the present invention are described in detail below with reference to the accompanying drawings.

BRIEF DESCRIPTION OF THE DRAWINGS FIGURES

The accompanying drawings, which are embodied in and constitute part of the specification, illustrate embodiments of the invention and, together with the general description given above and detail description of the embodiments given below, serve to explain the principles of the invention. In the invention:

FIG. 1 is a flowchart of a software technique for CRC check sum analysis;

FIG. 2 is an illustration of video data fields stored during CRC check sum analysis of FIG. 1;

DETAILED DESCRIPTION OF THE INVENTION

Figure 3:
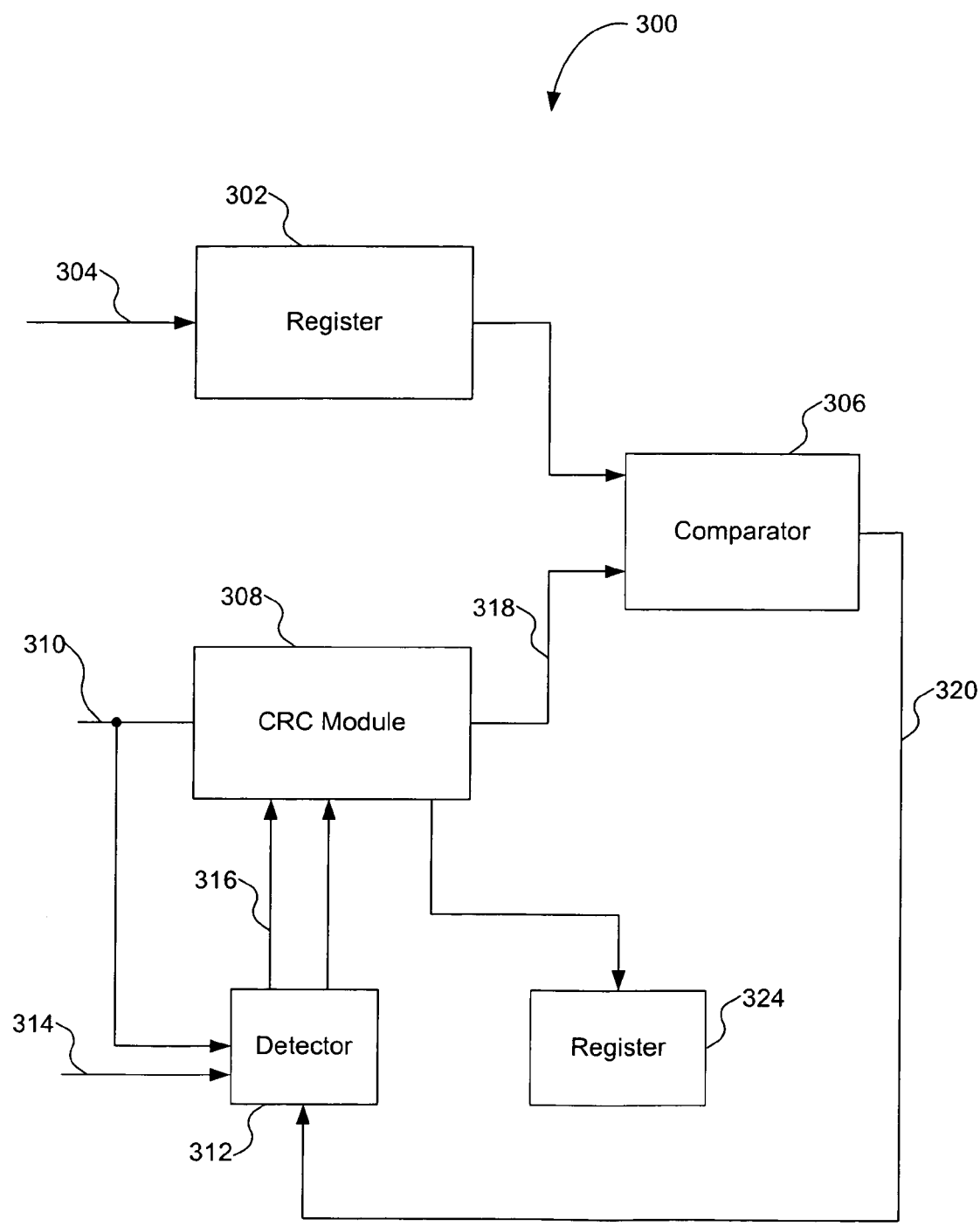
FIG. 3 is a block diagram illustration of an exemplary CRC check sum analysis device constructed and arranged in accordance with an embodiment of the present invention.

The following detailed description of the present invention refers to the accompanying drawings that illustrate exemplary embodiments consistent with this invention. Other embodiments are possible, and modifications may be made to the embodiments within the spirit and scope of the invention. Therefore, the following detailed description is not meant to limit the invention. Rather, the scope of the invention is defined by the impending claims.

It would be apparent to one of skill in the art that the present invention, as described below, may be implemented in many different embodiments of hardware, software, firmware, and/or the entities illustrated in the figures. In the actual software code with the controlled hardware to implement the present invention is not limiting of the present invention. Thus the operation and behavior of the present invention will be described with the understanding that modifications and variations of the embodiments are possible, given the level of detail presented herein.

FIG. 1 is a block diagram illustration of a software technique 100, used for CRC check sum testing in formal test set-ups. The conventional software technique 100, for example, can be used during regression testing of video systems. As illustrated in block 102 and during video scanning, for example, a CRC check sum module is enabled by using the software to set up an interrupt routine. As an initial matter, the software technique 100 must first wait for generation of an interrupt as indicated in block 104 using, for example, an interrupt service routine (ISR). Once the interrupt has been generated, the CRC module is enabled and can begin the accumulation of CRC check sums and to set up to receive its next interrupt, as indicated in block 106.

Use of the software routine 100 enables the CRC module to time the interrupts with occurrence of a synchronization marker at desired times or during specific events, such as video blanking. As noted above, synchronization markers, such as vertical synch, distinguish boundaries of one received data field from another received data field.

Next, the software routine 100, after enabling the CRC module to receive the first data field, waits for generation of another interrupt as illustrated in block 108.

Using the technique 100, or similar techniques, a user can specify a particular number of data fields for collection analysis. The user can also synchronize the timing of the collection process. In the technique 100, if a sufficient number of data fields has not been collected, the software routine 100 can again enable the CRC to receive an additional data field as illustrated in block 110. Once the desired field count has been reached, all of the accumulated CRCs are examined, as illustrated in block 112.

Software routines, such as the routine 100 of FIG. 1, enable a user to provide ISRs to the CRC module in synchronization with an occurrence of vertical synch pulses. The vertical synch pulses indicate the beginning and end of the associated data fields during CRC check sum testing. That is, the CRC module starts to collect data when active video pixels are coming in based upon the occurrence of the vertical synchronization pulse which define the pixel's boundaries.

For example, an ISR can be generated to record any number of data fields and, at the same time, disable the CRC module after collection of the last data field for examination of the associated check sum values. Software routines, such as the routine 100, facilitate a programmable number of data field counts such as 2, 3, 8 or any number, for use with CRC testing. For example, a particular number of data fields can be recorded within the CRC module. Afterwards, the field count can be checked. If the desired number has not been reached, the field count can be incremented by one, and the process is repeated until the desired number has been achieved. Further, these software routines permit specifying data collection not only in terms of field counts, but also in terms of periods of time. In this manner, the software provides the flexibility to record the check sum for any desirable increment during regression testing.

During bench testing, however, software routines, such as the routine 100, are impractical. Instead, during bench testing, testers typically use more flexible and dynamic testing methods, such as register access. Although conventional register access provides testers with a more convenient and more flexible testing technique, the associated check sum values are often inconsistent. The inconsistency results from an inability to precisely time the CRC module enablement with specific boundaries of the data fields. Additionally, register access techniques fail to provide testers with an ability to quickly change and specify the number of data fields to be recorded for the check sum analysis.

FIG. 2 is an illustration of data fields stored within a memory of the CRC module during CRC check sum testing associated with the method of FIG. 1. In FIG. 2, the CRC module can include, for example, stored pixel data fields 200. Within the data fields 200 are individual segments 202, 204, 206, and 208 that are representative of data fields 1 through 4.

As shown in FIG. 2, data field segments 202 and 204 are separated by a synchronization marker 210. The segments 204 and 206 are separated by a synchronization marker 212. And the segments 206 and 208 are separated by a synchronization marker 214. During bench testing, however, CRC module enablement can occur for example at a time 216, as indicated in FIG. 2.

With enablement occurring at the time 216, the first interrupt might subsequently occur, for example, at a time 218. The time 218, however, occurs during the video data field 202. The next interrupt might occur at a time 220, during video data field 204. A final CRC module interrupt 222 is shown to occur within data field 206. Since the CRC module interrupts 218, 220, and 222 do not occur in synchronism with the synchronization markers 210, 212 and 214, conventional bench test debugging will produce inconsistent check sum values because of the indistinguishable data fields A3

FIG. 3 provides a block diagram illustration 300 of an exemplary CRC checksum system 300 constructed and arranged in accordance with an embodiment of the present invention. In particular, the CRC checksum system 300 enables bench testers to selectively program a desired field count and provide synchronism between CRC module enablement and an occurrence of synchronization markers. This particular technique eliminates the problems noted above with regard to conventional bench testing.

In FIG. 3, an external memory device 302, such as a register, is added to a conventional video bench test set up. The register 302 is configured to receive as an input a desired numeric field count value 304. The field count value 304 enables a user to specifically program the number of field counts desired to perform CRC check sum analysis. During CRC check sum analysis, the desired field count value 304 is loaded into a comparator 306 for comparison with an actual field count value.

A CRC module 308 is coupled to the comparator 306 and, at least indirectly, to the register 302. The CRC module 308 receives as an input a video data stream 310 that includes, among other things, video pixel data and video synchronization markers. A detector 312 is coupled to the CRC module 308 and is structured to sense the video synchronization markers within the video data stream 310. The detector 312 also receives as an input a CRC enablement bit 314, which can be provided in real time by a user. During bench testing, when the user provides the CRC enablement bit 314, an associated synchronization marker, such as the vertical synch pulse, is sensed from the video data stream 310 by the detector 312. Consequently, an enablement command 316 is sent to the CRC module 308. The enablement command 316 signals the CRC module 308 to begin accumulating associated CRC check sums.

Among other things, the CRC module 308 provides a count of the accumulated data fields as an output along a data path 318 to the comparator 306. The comparator 306 compares the data field count produced by the CRC module 308 with the desirable field count number 304 provided by the register 302. When the field count number 304 matches the actual CRC field count from the data path 318, a disablement command 320 is supplied to the detector 312 for detection of an end-point of the final collected data field. Once the required number of data fields have been accumulated within the CRC module 308, the check sum values are recorded to another register 324. This process is illustrated in FIG. 4.

Figure 4:
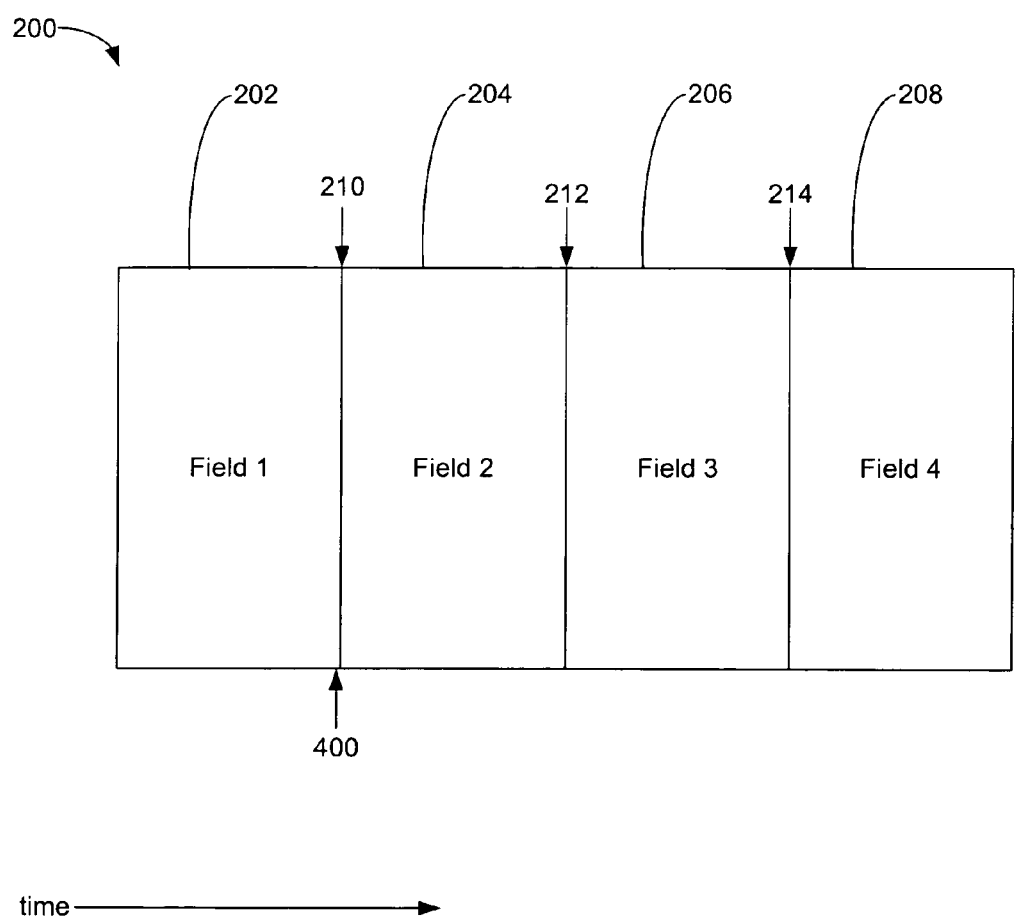
FIG. 4 is an illustration of video data fields stored within a memory of the check sum analysis device illustrated in FIG. 3.

By way of the example illustrated in FIG. 2, FIG. 4 provides a depiction of operation of the exemplary embodiment of the present invention shown in FIG. 3. In FIG. 4, the data field segments 202 through 208 are loaded into the CRC module 308. Here, for example, the user specifies a desirable number of field counts, such as two. That is, two data fields will be accumulated and examined for check sum analysis. In this example, the number "2" will be loaded in the register 302. Next, the user provides the CRC enablement bit 314 of FIG. 3 to initiate collection of checksums by the CRC module 308.

Next, the detector 312 senses a presence of the synchronization marker 210, and nearly simultaneously, provides a CRC module interrupt 400 to enable the CRC module 308. The synchronization marker 210 indicates a beginning of the first collected data segment 204. After the two segments 204 and 206 have been received by the CRC module 308, the CRC module disablement command 320 is sent to the detector 312. The detector 312 then senses the synchronization marker 214, indicating an end of the data field segment 214 and substantially simultaneously disables the CRC module 308. The CRC module 308, now having two complete data fields, 204 and 206 collected therein, will load their associated accumulated check sums into the register 324.

The system 300 provides bench testers with a technique to specify the number of data fields that will be examined for checksum analysis. It also provides the bench testers with a mechanism to ensure that the number of checksums that are analyzed are representative of complete data fields. The ability to specify the number of data fields and the ability to collect checksums from complete data fields produces more consistent and reliable bench testing results. This approach, due to its consistent results, can be used to automate the testing or software/hardware QA (Quality-Assurance) for video products, which traditionally require testers to perform visual inspection.

Figure 5:
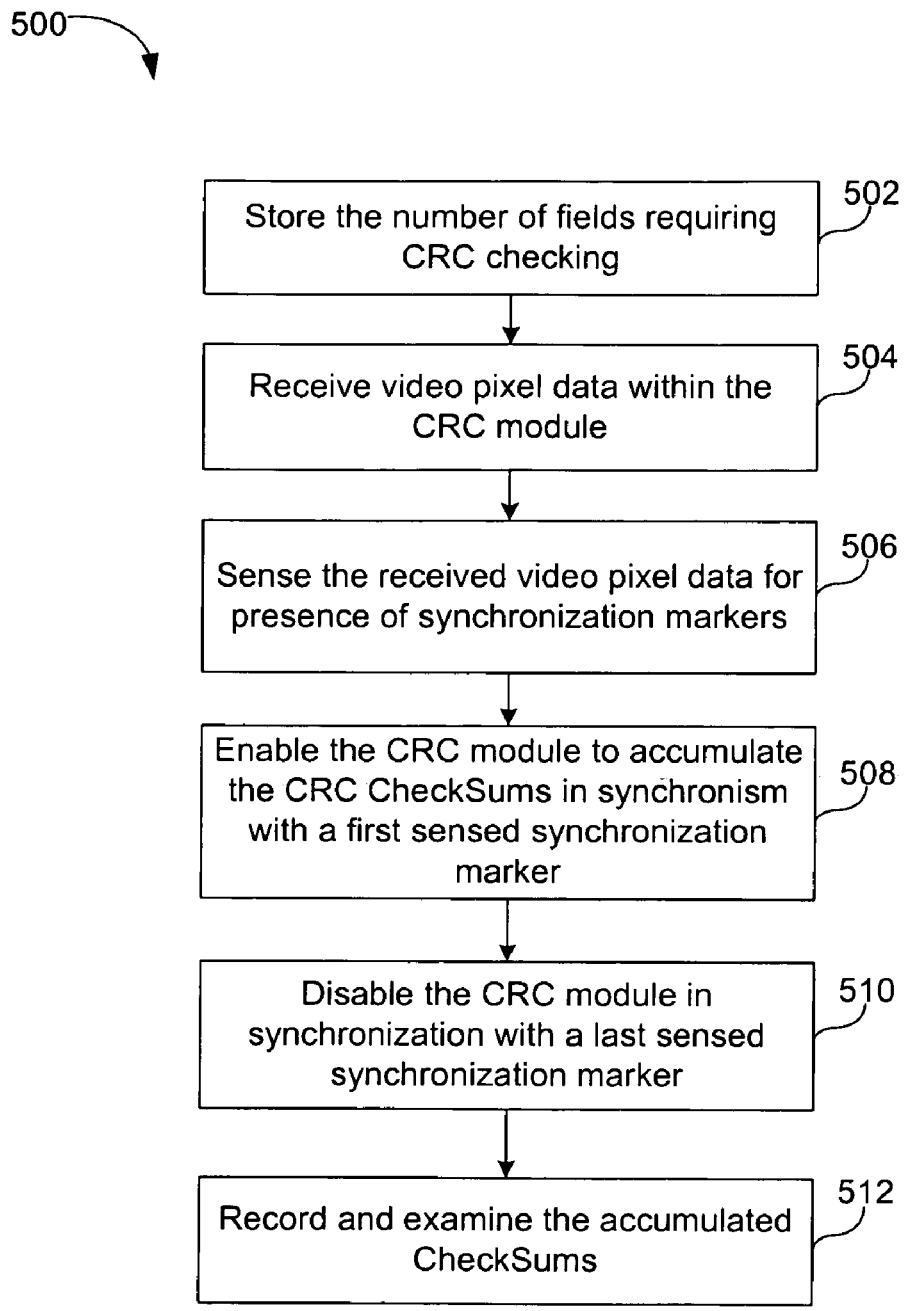
FIG. 5 is a flow diagram of an exemplary method of practicing an embodiment of the present invention.

FIG. 5 is a flow chart of an exemplary method 500 of practicing the present invention. In FIG. 5, the CRC analysis system 300 stores a desired number of fields requiring CRC analysis in the register 302, as illustrated in block 502. Next, video pixel data 310 is received in the CRC module 308, as indicated in block 504. The detector 312 senses the received video pixel data for a presence of synchronization markers, as shown in block 506. When markers, such as the markers 210 through 214 are detected, the CRC module 308 is enabled in a manner indicated in block 508. When the required number of video data fields has been collected, the CRC module 308 is disabled, as indicated in block 510. Finally, the accumulated check sum values are recorded in the register 324 as indicated in block 512.

The present invention provides a function that enables a user to specify a programmable number of field counts for a CRC module to analyze the CRC check sum. It contains one register that specifies a number of fields to be recorded and a bit to enable the CRC analysis. Once CRC analysis has been enabled, the associated hardware will start performing CRC analysis at the next pixel start and continue to record the check sum until the specified number of fields has been analyzed. It terminates check sum analysis at the end of that specified field count.

In bench debugging, the present invention enables users to manually program a register to specify the number of fields requiring check sum testing. This technique prevents the need for complicated test software having sophisticated ISRs. It also provides a flexible dynamic mechanism for achieving consistent CRC results during bench test debugging.

Figure 6:
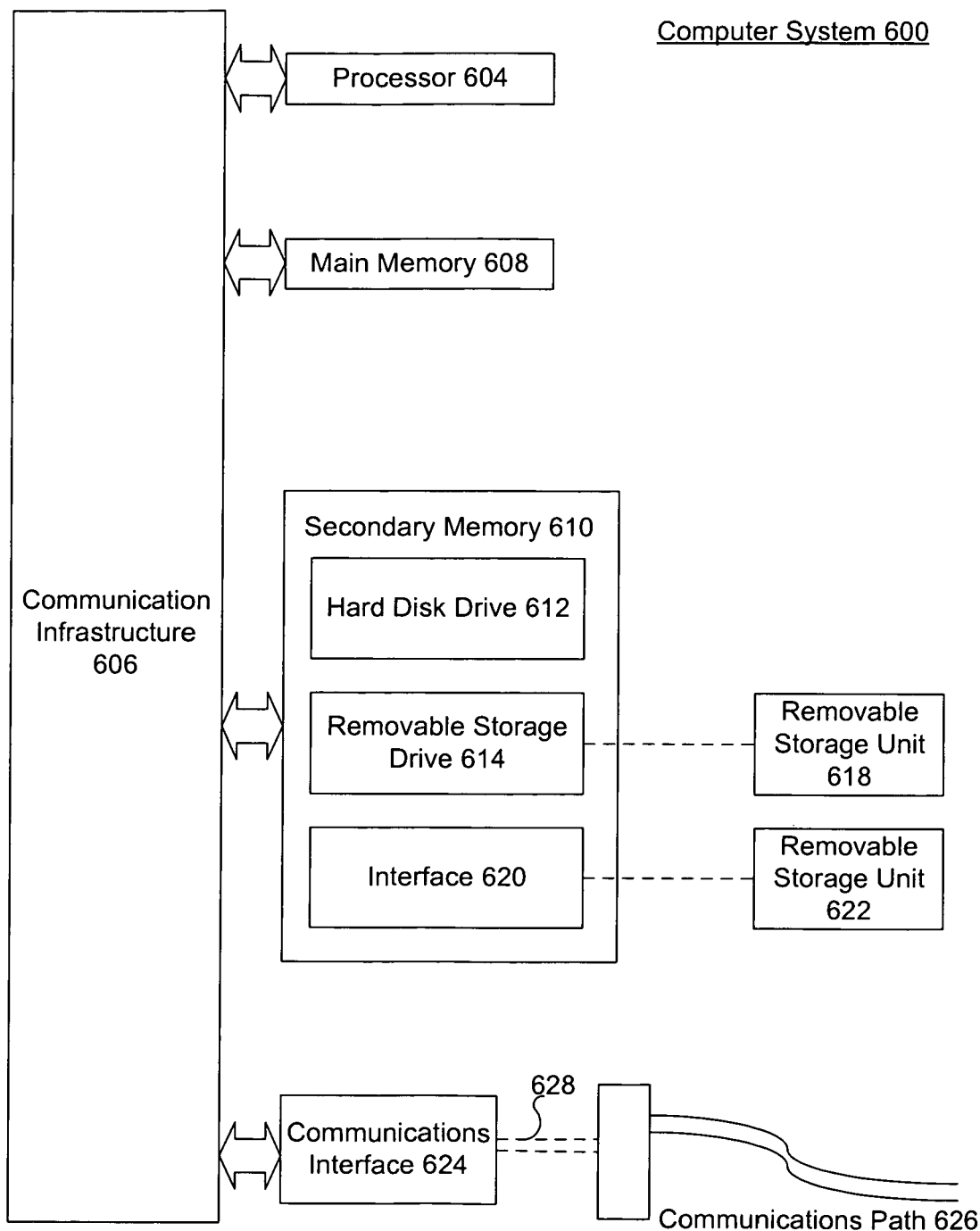
FIG. 6 is a block diagram of an exemplary computer system all of which the present invention can be practiced.

FIG. 6 provides an illustration of a general purpose computer system and is provided for completeness. As stated above, the present invention can be implemented in hardware, or as a combination of software and hardware. Consequently, the invention may be implemented in the environment of a computer system or other processing system. An example of such a computer system 600 is shown in FIG. 6.

The computer system 600 includes one or more processors, such as a processor 604. The processor 604 can be a special purpose or a general purpose digital signal processor and it's connected to a communication infrastructure 606 (for example, a bus or network). Various software implementations are described in terms of this exemplary computer system. after reading this description, it will become apparent to a person skilled in the relevant art how to implement the invention using other computer systems and/or computer architectures.

The computer system 600 also includes a main memory 608, preferably random access memory (RAM), and may also include a secondary memory 610. The secondary memory 610 may include, for example, a hard disk drive 612 and/or a removable storage drive 614, representing a floppy disk drive, a magnetic tape drive, an optical disk drive, etc. The removable storage drive 614 reads from and/or writes to a removable storage unit 618 in a well known manner. The removable storage unit 618, represents a floppy disk, magnetic tape, optical disk, etc. which is read by and written to by removable storage drive 614. As will be appreciated, the removable storage unit 618 includes a computer usable storage medium having stored therein computer software and/or data.

In alternative implementations, the secondary memory 610 may include other similar means for allowing computer programs or other instructions to be loaded into the computer system 600. Such means may include, for example, a removable storage unit 622 and an interface 620. Examples of such means may include a program cartridge and cartridge interface (such as that found in video game devices), a removable memory chip (such as an EPROM, or PROM) and associated socket, and the other removable storage units 622 and the interfaces 620 which allow software and data to be transferred from the removable storage unit 622 to the computer system 600.

The computer system 600 may also include a communications interface 624. The communications interface 624 allows software and data to be transferred between the computer system 600 and external devices. Examples of the communications interface 624 may include a modem, a network interface (such as an Ethernet card), a communications port, a PCMCIA slot and card, etc. Software and data transferred via the communications interface 624 are in the form of signals 628 which may be electronic, electromagnetic, optical or other signals capable of being received by the communications interface 624. These signals 628 are provided to the communications interface 624 via a communications path 626. The communications path 626 carries the signals 628 and may be implemented using wire or cable, fiber optics, a phone line, a cellular phone link, an RF link and other communications channels.

In the present application, the terms "computer readable medium" and "computer usable medium" are used to generally refer to media such as the removable storage drive 614, a hard disk installed in the hard disk drive 612, and the signals 628. These computer program products are means for providing software to the computer system 600.

Computer programs (also called computer control logic) are stored in the main memory 608 and/or the secondary memory 610. Computer programs may also be received via the communications interface 624. Such computer programs, when executed, enable the computer system 600 to implement the present invention as discussed herein.

In particular, the computer programs, when executed, enable the processor 604 to implement the processes of the present invention. Accordingly, such computer programs represent controllers of the computer system 600. By way of example, in the embodiments of the invention, the processes/methods performed by signal processing blocks of encoders and/or decoders can be performed by computer control logic. Where the invention is implemented using software, the software may be stored in a computer program product and loaded into the computer system 600 using the removable storage drive 614, the hard drive 612 or the communications interface 624.

The present invention has been described above with the aid of functional building blocks illustrating the performance of specified functions and relationships thereof. The boundaries of these functional building blocks have been arbitrarily defined herein for the convenience of the description. Alternate boundaries can be defined so long as the specified functions and relationships thereof are appropriately performed.

Any such alternate boundaries of thus within the scope and spirit of the claimed invention. One skilled in the art would recognize that these functional building blocks can be implemented by analog and/or digital circuits, discreet components, application specific integrated circuits, firmware, processors executing appropriate software and the like or any combination thereof. Thus, the breadth and scope of the present invention should not be limited by any way of the above described exemplary embodiments, but should be defined only in accordance with the following claims and their equivalents.

What is claimed is:

1. An apparatus for conducting bench testing of data fields, comprising:
   a memory configured to store a number representative of the number of data fields to be analyzed;
   a hardware module coupled, at least indirectly, to the memory and configured to (i) receive an input data stream, (ii) perform a cyclic redundancy checksum (CRC) processing on the received data stream, and (iii) produce an output representative of an actual number of received data fields analyzed, wherein the input data stream includes synchronization markers defining boundaries of each of the received data fields;
   a comparator configured to (i) compare the number stored in memory and the actual number of received data fields for which CRC has been processed and (ii) produce a disabling signal when the actual number matches the number stored in the memory; and
   a detector coupled to the comparator and configured to (i) receive the input data stream and sense the synchronization markers, (ii) receive the disabling signal, and (iii) disable the module when the disabling signal is received.

2. The apparatus of claim 1, wherein the module commences the processing in synchronism with a first of the synchronization markers; and
   wherein the module is disabled in substantial synchronism with another of the synchronization markers.

3. The apparatus of claim 1, wherein the hardware module is configured to receive video pixel data.

4. The apparatus of claim 1, wherein the memory is a register.

5. The apparatus of claim 1, wherein the hardware module is configured to receive vertical synchronization markers.

6. The apparatus of claim 5, wherein the hardware module is configured to receive a vertical synchronization marker during video blanking.

7. A method for performing cyclic redundancy checksum (CRC) processing of video data in a bench testing system including a memory and a CRC module coupled, at least indirectly, to the memory, the video data including (i) a number of data fields and (ii) synchronization markers defining boundaries of the data fields, the method comprising:
   storing a number in the memory, the number being representative of the number of data fields to be checked;
   receiving the data fields and their associated synchronization markers in the CRC module; and
   storing a number of data fields equal to the number of data fields to be checked, in synchronism with a first synchronization marker associated with a beginning of a first received field of the data fields.

8. The method of claim 7, wherein the CRC module ceases receiving data fields in synchronism with a last marker associated with an end of a last of the received fields of the number of data fields to be checked.

9. An apparatus configured to perform cyclic redundancy checksum (CRC) processing of video data, the video data having a plurality of data fields and synchronization markers defining boundaries of each of the data fields, the apparatus comprising:
   a memory configured for storing a number, the number being representative of a quantity of data fields to be checked;
   a CRC module coupled, at least indirectly, to the memory and configured to receive the data fields and the synchronization markers
   a sensing device coupled to the CRC module and configured to sense the synchronization markers; and
   wherein the CRC module commences processing the data fields in synchronism with a first sensed synchronization marker.

10. The apparatus of claim 9, wherein the CRC module ceases processing data fields in synchronism with a last sensed synchronization marker.

11. The apparatus of claim 9, wherein the memory is a register.

12. The apparatus of claim 9, wherein the apparatus is a video test bench set-up.

* * * * *